(«12») United States Patent
Guim Bernat et al.

(10) Patent No.: US 10,608,956 B2
(45) Date of Patent: Mar. 31, 2020

(54) ADAPTIVE FABRIC MULTICAST SCHEMES

(71) Applicant: Intel Corporation, Santa Clara, CA (US)

(72) Inventors: Francesc Cesc Guim Bernat, Barcelona (ES); Karthik Kumar, Chandler, AZ (US); Thomas Willhalm, Sandhausen (DE); Raj K. Ramanujan, Federal Way, WA (US); Narayan Ranganathan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 14/973,155

(22) Filed: Dec. 17, 2015

(65) Prior Publication Data
US 2017/0180270 A1    Jun. 22, 2017

(51) Int. Cl.
| | | |
|---|---|---|
| *H04L 12/931* | (2013.01) | |
| *H04L 1/00* | (2006.01) | |
| *H04L 12/18* | (2006.01) | |
| *H04L 12/26* | (2006.01) | |
| *H04L 12/927* | (2013.01) | |
| *H04L 12/24* | (2006.01) | |

(52) U.S. Cl.
CPC ........ *H04L 49/201* (2013.01); *H04L 12/1845* (2013.01); *H04L 43/10* (2013.01); *H04L 47/806* (2013.01); *H04L 41/5006* (2013.01)

(58) Field of Classification Search
CPC ... H04L 49/201; H04L 12/1845; H04L 43/10; H04L 47/806; H04L 41/5006
See application file for complete search history.

(56) References Cited

U.S. PATENT DOCUMENTS

| 7,385,978 B1 * | 6/2008 | Yang ...................... H04L 12/66 370/390 |
| 9,374,303 B1 * | 6/2016 | Ulman ................... H04L 49/201 |
| 9,900,169 B2 * | 2/2018 | Thubert .............. H04L 12/1881 |
| 2003/0152098 A1 | 8/2003 | Zhu |

(Continued)

OTHER PUBLICATIONS

"International Application Serial No. PCT/US2016/063915, International Search Report dated Feb. 28, 2017", 4 pgs.

(Continued)

*Primary Examiner* — Luat Phung
(74) *Attorney, Agent, or Firm* — Schwegman Lundberg & Woessner, P.A.

(57) ABSTRACT

Described herein are devices and techniques for distributing application data. A device can communicate with one or more hardware switches. The device can receive, from a software stack, a multicast message including a constraint that indicates how application data is to be distributed. The constraint including a listing of the set of nodes and a number of nodes to which the application data is to be distributed. The device may receive, from the software stack, the application data for distribution to a plurality of nodes. The plurality of nodes being a subset of the set of nodes equaling the number of nodes. The device may select the plurality of nodes from the set of nodes. The device also may distribute a copy of the application data to the plurality of nodes based on the constraint. Also described are other embodiments.

25 Claims, 10 Drawing Sheets

(56) References Cited

U.S. PATENT DOCUMENTS

| | | | |
|---|---|---|---|
| 2007/0076739 A1* | 4/2007 | Manjeshwar | H04L 12/1881 370/432 |
| 2009/0103468 A1* | 4/2009 | Kasapidis | H04L 12/185 370/312 |
| 2009/0274160 A1* | 11/2009 | Yanagihara | H04L 12/1854 370/408 |
| 2010/0312871 A1 | 12/2010 | Desantis et al. | |
| 2011/0002334 A1* | 1/2011 | Baduge | H04L 12/185 370/390 |
| 2011/0178985 A1 | 7/2011 | San Martin Arribas et al. | |
| 2013/0329578 A1* | 12/2013 | Groves | H04L 43/026 370/252 |
| 2014/0281345 A1 | 9/2014 | Li et al. | |
| 2015/0121131 A1 | 4/2015 | Kiselev et al. | |
| 2015/0222443 A1* | 8/2015 | Basso | H04L 47/29 370/230 |
| 2015/0229677 A1* | 8/2015 | Gu | H04L 65/103 709/219 |
| 2016/0043932 A1* | 2/2016 | Karthikeyan | H04L 12/18 370/390 |
| 2017/0118033 A1* | 4/2017 | Srinivasan | H04L 12/18 |

OTHER PUBLICATIONS

"International Application Serial No. PCT/US2016/063915, Written Opinion dated Feb. 28, 2017", 10 pgs.

\* cited by examiner

ADAPTIVE FABRIC MULTICAST SCHEMES

TECHNICAL FIELD

Embodiments described generally herein relate to processing of data packets sent or received through a network. Some embodiments relate to adaptive multicast schemes.

BACKGROUND

Top-of-rack switches and special function hardware provide network functions including packet switching, security, deep packet inspection, and other functions. Recently, there has been a trend to provide virtual switches and network functions executing on high-volume computer architectures. Ongoing efforts are directed to improving coordination between switches to take advantage of speed benefits in hardware switches and flexibility and power of virtual switches.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
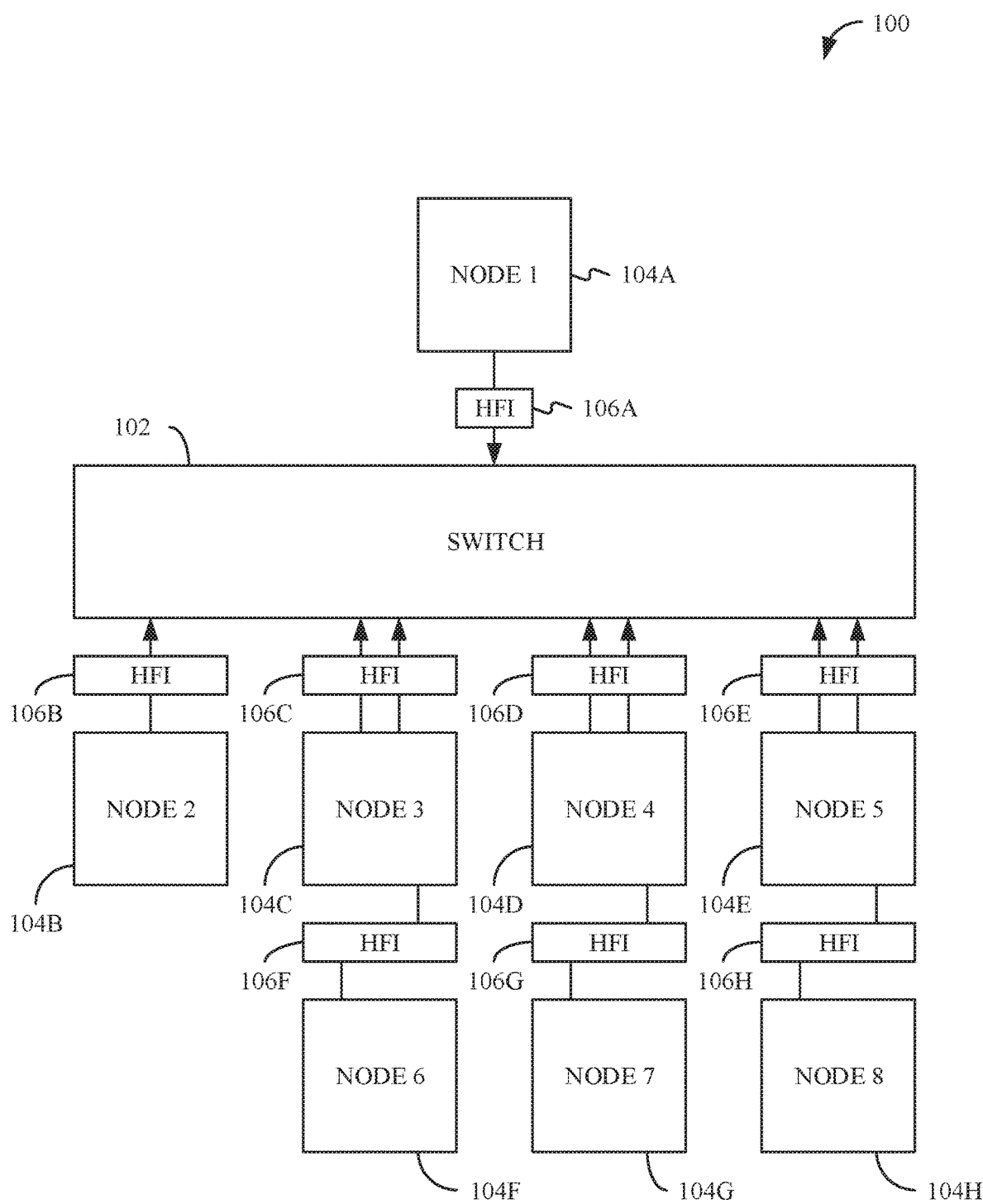
FIG. 1 illustrates a fabric interconnect architecture in accordance with some embodiments.

Multicast messages are used to implement one-to-many node communications. In this scenario, one node (referenced herein as an "originator" or "requestor") sends one message through a fabric interconnect targeting different nodes connected to the fabric (referenced herein as a "target" or "targets"). The fabric interconnect architecture can be responsible for implementing multicast semantics from the interconnect point of view (i.e., routing protocols, message transmit, etc.). As disclosed herein a fabric component implementing the multicast semantics can be a switch.

Consistent with embodiments disclosed herein, a software stack or an application executing within a software stack can provide more semantics in the multicast messages. The semantics can help the fabric interconnect to make dynamic decisions. The decisions may improve system utilization and load balancing while meeting multicast service-level agreements. The service-level agreements may be specified by an application or by a service contract between two parties. The service level agreements may include a specification or constraint that includes a list of acceptable candidates for a multicast message and a number (N) of required targets that need to receive the message. For example, a service level agreement to achieve replication could be "multicast to any 3 of the following 5 nodes: A, B, C, D, and E and tell me which nodes you selected."

Consistent with embodiments disclosed herein, the fabric may adaptively decide to which set of targets the message will be delivered. The Host Fabric Interface (HFI) on the target side of a node may acknowledge back to the originator that the message has been received. The acknowledgement can be a communication back to the originator of the decision made by the fabric.

Embodiments disclosed herein may include a fixed number of targets. The fabric may use information included within the multicast message, such as a constraint, as a communication from the software stack. The fabric may make decisions using the multicast message to improve the overall system utilization, beyond generic adaptive routing schemes for a fixed set of targets.

Stated another way, constraints and information can be provided to the fabric that can be used to make more adaptive and intelligent decisions regarding how (and who) to spawn multicast messages. The techniques and methods disclosed herein can be used in parallel with existing adaptive routing techniques. Moreover, existing adaptive techniques can make use of the techniques and methods disclosed herein to decide what paths the multicast messages may take.

The multicast messaging disclosed herein may allow software stacks to specify a service level agreement for multicast. In other words, the software stack may specify a constraint for distributing a copy of data and multicast messages. The constraint may include a list of candidates to receive the multicast message and a number that specifies how many of these candidates must receive it. In addition, the constraint can include a group identifier that identifies a set of nodes, such as the list of candidates, to receive the multicast message. Furthermore, the constraint can include identifiers for the set of nodes and a number of nodes to which the application data is to be distributed. The application data can be included with the multicast message or the application data can be sent and received separately from the multicast message.

As disclosed herein, a software stack or an application operating in the software stack may generate a multicast message. For example, an application may desire to replicate a request, to generate backups, or to make a transactional commit for an in-memory operation. The multicast message may be destined to N different targets. The multicast message may specify N and data to replicate. In addition to specifying N targets, the multicast message also may specify a set of M potential targets where M is greater than N. For example, the multicast message may specify $Target_1$, $Target_2 \ldots Target_M$. Depending on the fabric technology, the targets can be specified via a list or to a multicast topology identified by a destination ID. In the case of STL, a multicast topology ID may be used where each topology is predefined by a set of different node IDS.

The application may send the multicast message to a switch. The switch may decide how the current multicast message needs to be spawned and routed within the fabric. In the various examples mentioned herein, the switch may select a set of M targets such that the links have given congestion and latency The given congestion and latency can be that the congestion and latency are less than or greater than a given threshold for each. Still consistent with embodiments disclosed herein an optimization algorithm can select K switch ports to spawn the multicast and can be based on multiple criteria that take into account existing adaptive routing techniques.

Once the messages arrive at the target nodes, the HFI in the target nodes may generate and acknowledge back to the requestor node. In acknowledging back to the requester node, the target nodes may provide their own ID and the ID for the multicast transaction.

When the acknowledgement arrives at the multicast requestor, the HFI may propagate the acknowledgement back to a software stack. In addition, the software stack can include an application running on the node associated with the HFI. The IDs may be needed by the software stack to identify to which nodes and software entities the multicast was distributed. For example, in the case of a backup multicast message, the software generating the replica to three different nodes may need to know to which precise servers the back was replicated in order to take the proper actions in case of a restore is later needed.

FIG. 1 shows a fabric interconnect architecture 100 in accordance with some embodiments. The fabric interconnect architecture 100 may include a switch 102 and a plurality of nodes 104a, 104b, 104c, 104d, 104e, 104f, 104g, and 104h. Each of the nodes 104a-104h may include a host fabric interface (HFI) 106a, 106b, 106c, 106d, 106e, 106f, 106g, and 106h. The HFI 106a, 106b, 106c, 106d, 106e, 106f, 106g, and 106h may allow the various nodes 104a, 104b, 104c, 104d, 104e, 104f, 104g, and 104h to communicate with one another.

During operation, node 104a may send a multicast message to one or more of nodes 104b, 104c, 104d, 104e, 104f, 104g, and 104h. Different software entities may utilize the HFIs 106a, 106b, 106c, 106d, 106e, 106f, 106g, and 106h to communicate with other entities executing (i.e., running) in other nodes 104b, 104c, 104d, 104e, 104f, 104g, and 104h. In a highly congested situation, some paths of the fabric interconnect architecture 100 may become more saturated than others.

Depending on the path that multicast messages take, they may experience higher latencies and lower throughput. To avoid high latencies and low throughput, the fabric interconnect architecture 100 may provide adaptive routing schemes where the routing can also be based on the congestion of the different paths.

For example, there may be scenarios where an application issues multicast commands over the fabric interconnect architecture 100 in order to replicate data. This replication can be done to handle failures. As an example, a Hadoop distributed file system (HDFS) may require that for any unit of data, more than one copy of the data be maintained on different nodes. An entity, such as for example, a name node (e.g., node 104a), may select the nodes (e.g. node 104b, node 104d, and node 104h) from a set of candidates (nodes 104b-104h) while keeping track of the same.

Consistent with embodiments disclosed herein, adaptive routing schemes can be improved when applications provide constraints to the fabric interconnect architecture 100. The constraint may relax some of the routing conditions. For example, a multicast variant where, using information provided by the application, the switch 102 can dynamically make routing decisions that can improve the overall utilization and performance perceived by the application. For instance, the multicast variant can include a number of nodes that the data is to be distributed to and the switch 102 can select the nodes from the nodes 104b-104h. In addition to specifying a number of nodes that the data is to be distributed to, the constraint can include geographic specifications such as the data needs to be stored on nodes that are a minimum geographic distance apart from one another. In addition, the constraint can include specifications regarding latency requirements, uptime, as well as resource usage. For example, the constraint can include a specification that the data be sent to a node with a certain latency and that may only be using 75% of available resources.

Figure 2:
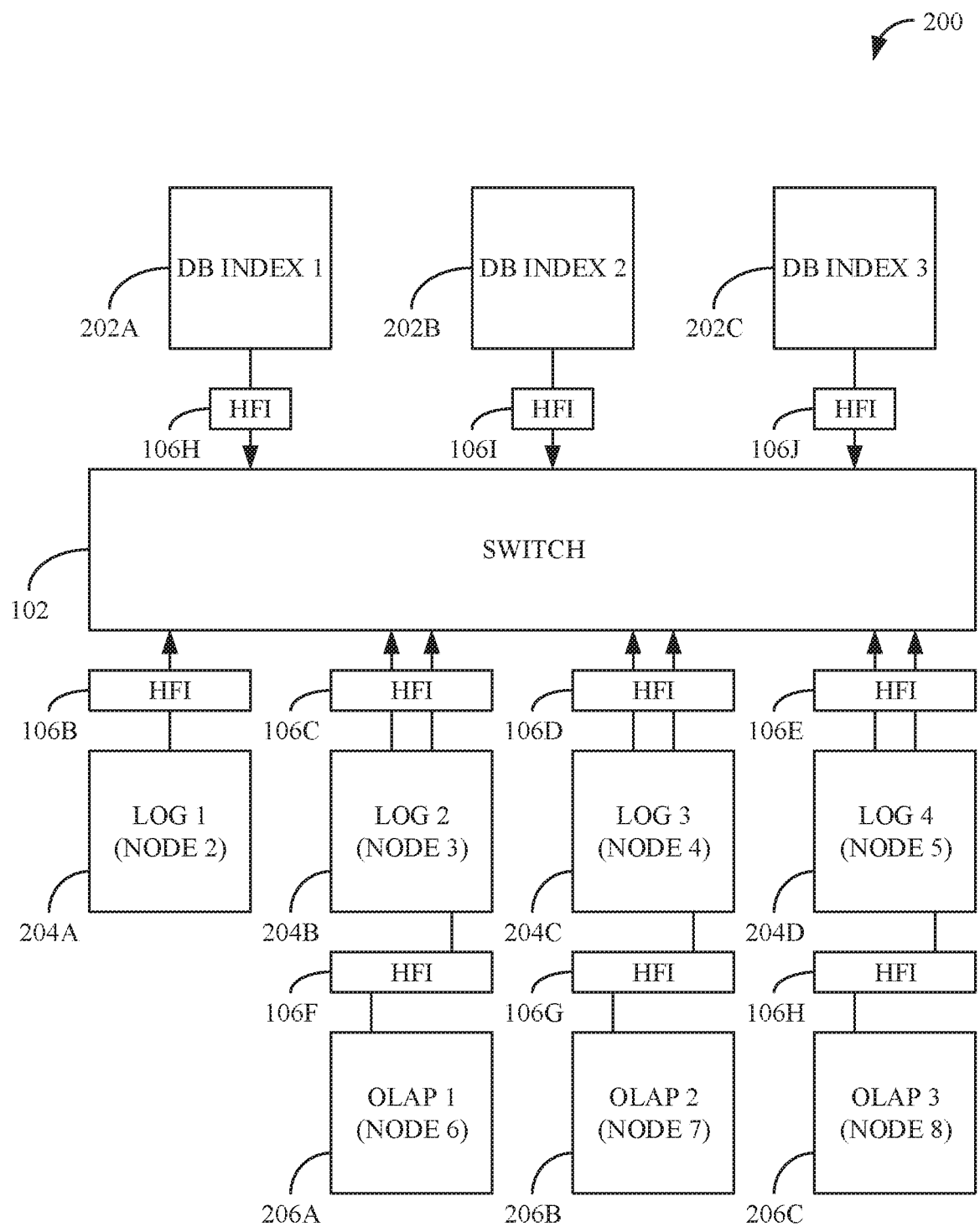
FIG. 2 illustrates a scale out database in accordance with some embodiments.

FIG. 2 presents a potential scale out configuration for a database framework 200 in accordance with some embodiments. The database framework 200 may include index servers 202a, 202b, and 202c and log servers 204a, 204b, 204c, and 204d. The log servers 204a-204d may log the actions done by the index servers 202a-202c. The log servers 204a-204d may implement a distributed log. The log may need to be replicated on more than one machine, to protect against machine failure. In addition, the distributed log may be used to avoid a centralized bottleneck in the database framework 200. In various embodiments, an in-memory transaction may need to be committed to one of the log servers (e.g., log server 204a) before it can be considered complete. Additional services that may belong to the database framework 200 may be marked as OLAP 206a, OLAP 206b, and OLAP 206c.

Figure 3:
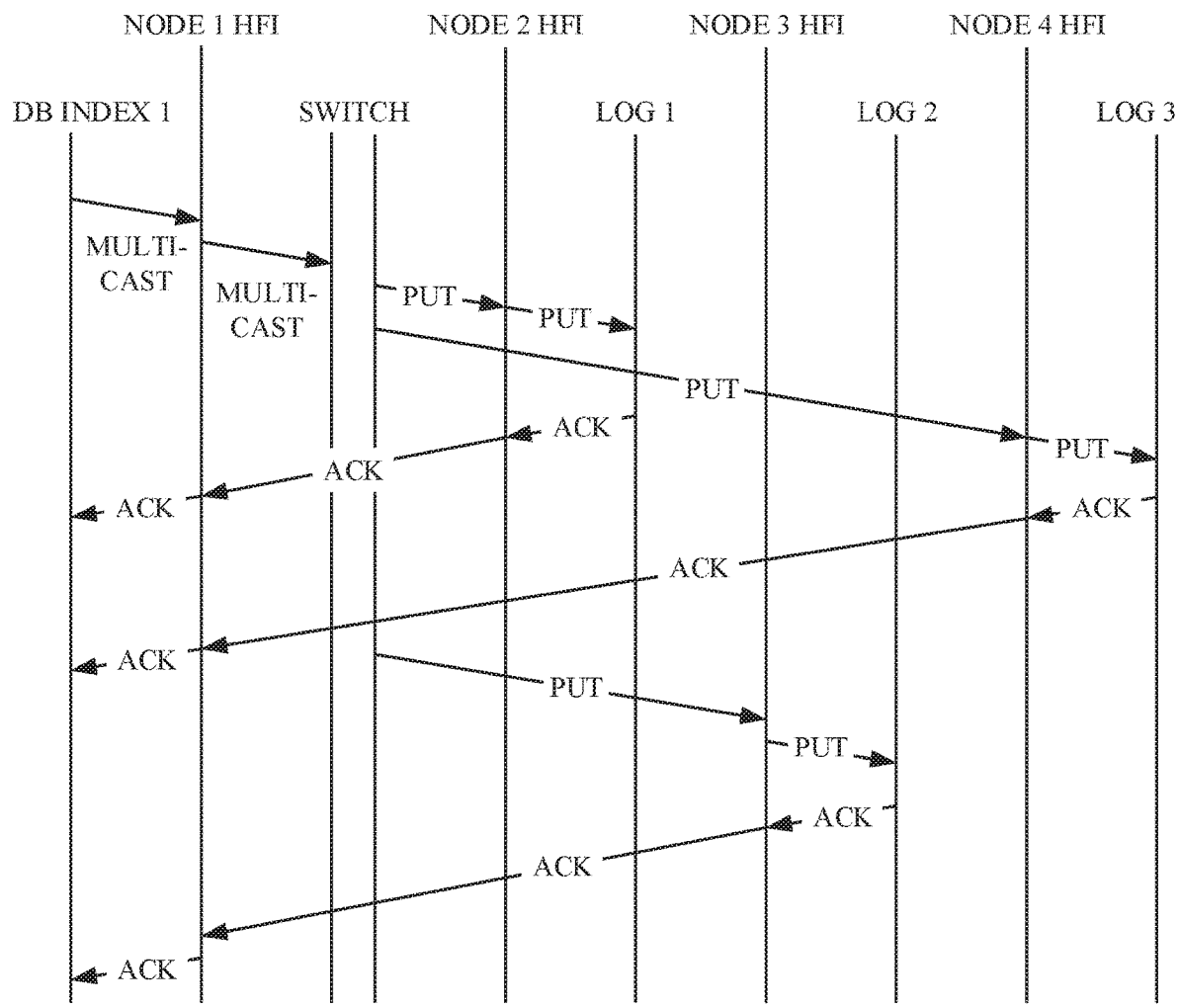
FIG. 3 illustrates database replication according to available systems for purposes of comparison of solutions in accordance with some embodiments.

FIG. 3 illustrates database replication according to available systems, such as the architecture described with regards to FIG. 1, for purposes of comparison of solutions in accordance with some embodiments. As shown in FIG. 3, a DB index server may want to distribute data to three log servers. Thus, the DB index server may generate a multicast message containing the data to store to the logs, such as for example Log 1, Log 2 and Log 3. The multicast message may be stored in the switch 102 ingress and start to be processed. The switch 102 may generate a put message targeting the Node 2. The put message may be moved to the egress of the switch 102 and transmitted to the Node 2 HFI. However, as depicted in FIG. 3, the switch 102 egress connected to the Node 3 HFI may be full. Thus, the message targeting Log 2 may get substantially delayed until the corresponding egress has more room to process and store the message. As a result, the entire store transaction may get substantially delayed. In this scenario, if DB Index server 1 would have selected Log 3 instead of Log 2 the transaction could have finished substantially earlier (assuming for the example that HFI for the node 4 hosting Log 3 was not full).

Figure 4:
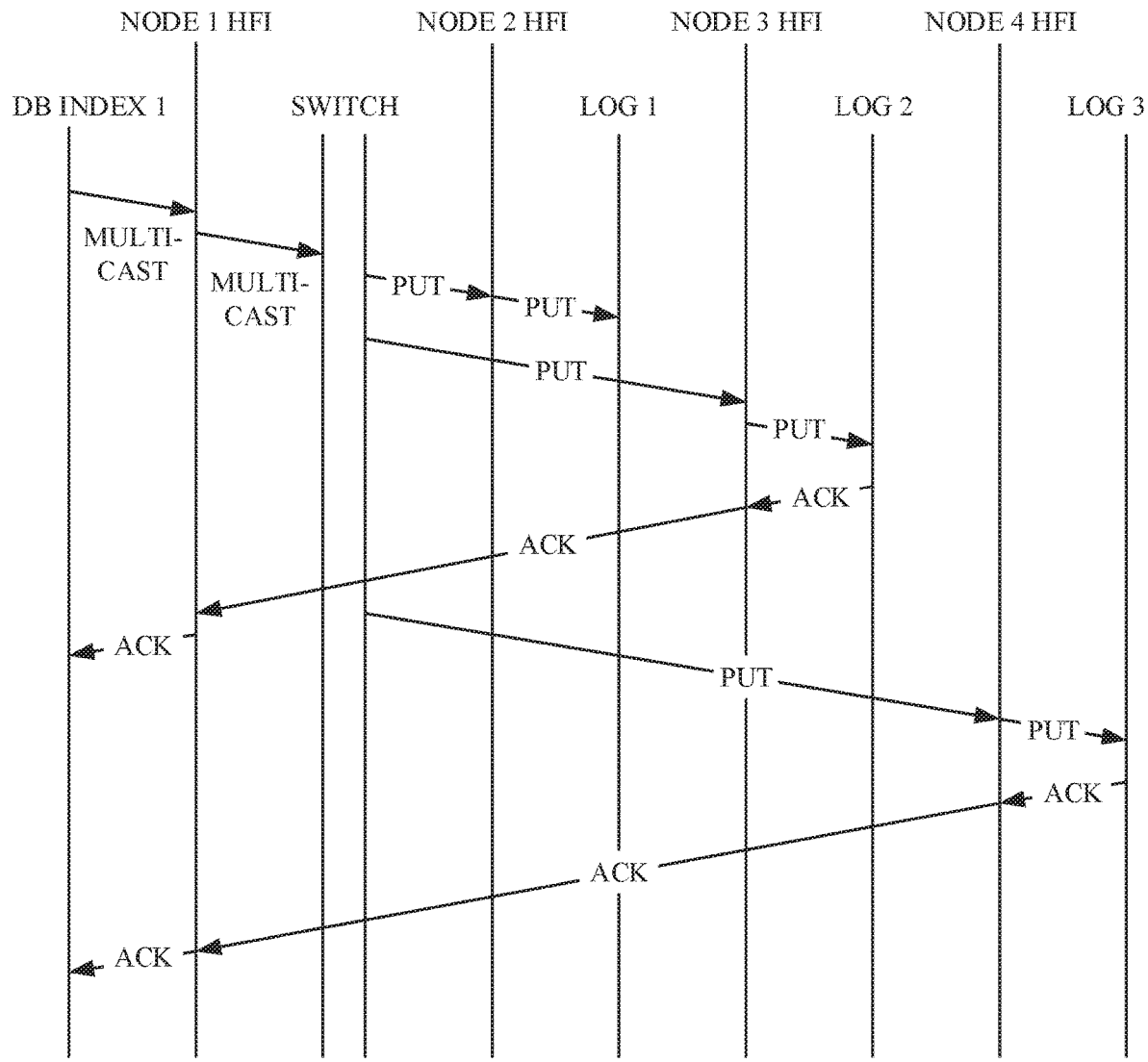
FIG. 4 illustrates database replication in accordance with some embodiments.

As shown in FIG. 4, the situation of store transactions being delayed can get worse in scenarios where the switch 102 cannot forward a message to target N+1 until a message to target N has been copied from the ingress of the switch 102 to the egress of the switch 102. In this architecture, when a multicast message gets accepted in the ingress of the switch 102 it is serially copied from the ingress of the switch 102 to the corresponding egress of the switch 102 (i.e., egress injects message to the specific target). FIG. 3 depicts how the previous scenario could get worse in a situation when the switch 102 serializes multicasts and cannot process next request.

In both of the previous situations shown in FIG. 3 and FIG. 4, the database server (DB Index1) could potentially use any of the different log servers for replication. Thus, providing information, such as the constraint, in the multicast message could help components of the fabric interconnect architecture 100 dynamically make decisions based on links and resource utilization. Including the constraint in the multicast message and allowing the fabric interconnect architecture 100 to make decision based on links and resource utilization may provide higher response time to the multicast request.

Scale out enterprise applications may include distributed components that can interact and need high throughput and low latency connections. Multicast techniques as disclosed herein may be used as a means to enhance performance for replications schemes addressing different type of problems. For example, high availability, response time, redundancy, and replication or backup may require high throughput and low latency connections. Replicating data to additional servers can be used to protect against machine failures.

As data volumes continue to grow, computing requirements may correspondingly increase. Scaling out by adding more servers can meet the computing requirement provided the fabric interconnect between the servers does not cause a bottleneck or other problems. Therefore, enabling enterprise application software to guide the fabric interconnect architecture to make better, more informed, and more intelligent routing decisions, and therefore improve overall efficiencies in the data center.

Figure 5:
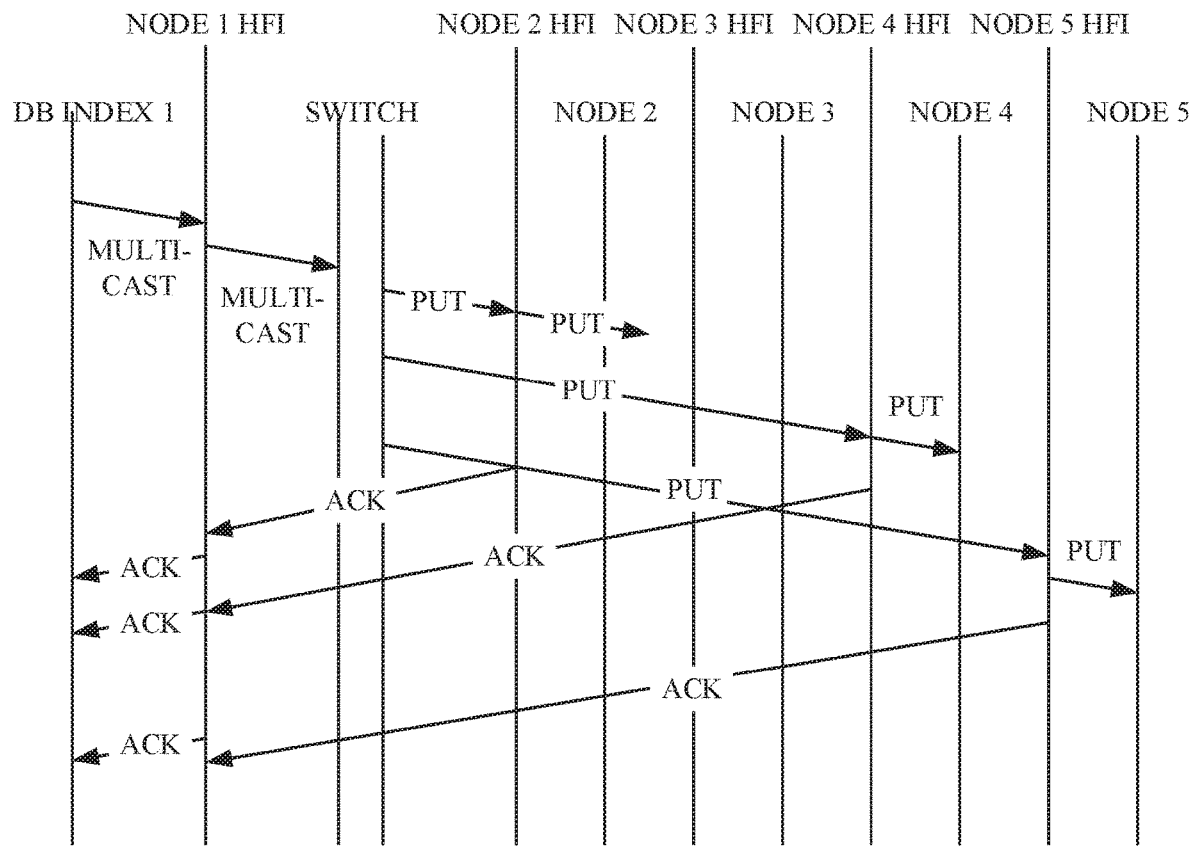
FIG. 5 illustrates an example of a multicast flow in accordance with some embodiments.

FIG. 5 provides an example of a multicast flow in accordance with some embodiments. An application running on Node 1 may generate a multicast message to be sunk to two targets. In other words, the multicast message may arrive at the targets and be accepted by the targets. The potential candidates for multicast message are Node 2 through Node 5. The multicast message may arrive at the switch and the multicast message may get sunk into the ingress of the switch. The switch may identify that the multicast can potentially spawn the multicast message to five different candidates. The switch egress connected to Node 2 may be full. Because the egress connected to Node 2 is full, the switch may decide to send the multicast message to Nodes 4 and Node 5 when the egress and links to both Node 4 and Node 5 are not fully utilized. Once the multicast message gets sunk into Node 4 HFI and Node 5 HFI, the HFIs may send an acknowledgement back to Node 1. Node 1 HFI may propagate the acknowledgement back to software stack.

Consistent with embodiments disclosed herein, a transport layer of an existing network protocol may be extended to expose the multicast operations disclosed herein. For example, in an embodiment employing the Portals Network Programming Interface layer 4 could implement the new flow as described in FIG. 5.

The HFI may implement the changes in the transport layer. This includes interfaces to the software stack in order to access to the multicast operation, the multicast generation in the requestor side, and acknowledgement generation in the target side.

Network switches may also be extended to implement the changes to support the new multicast protocol. The routing layer may also be extended to take into account the new multicast parameters to decide the paths for the multicast message.

Figure 6:
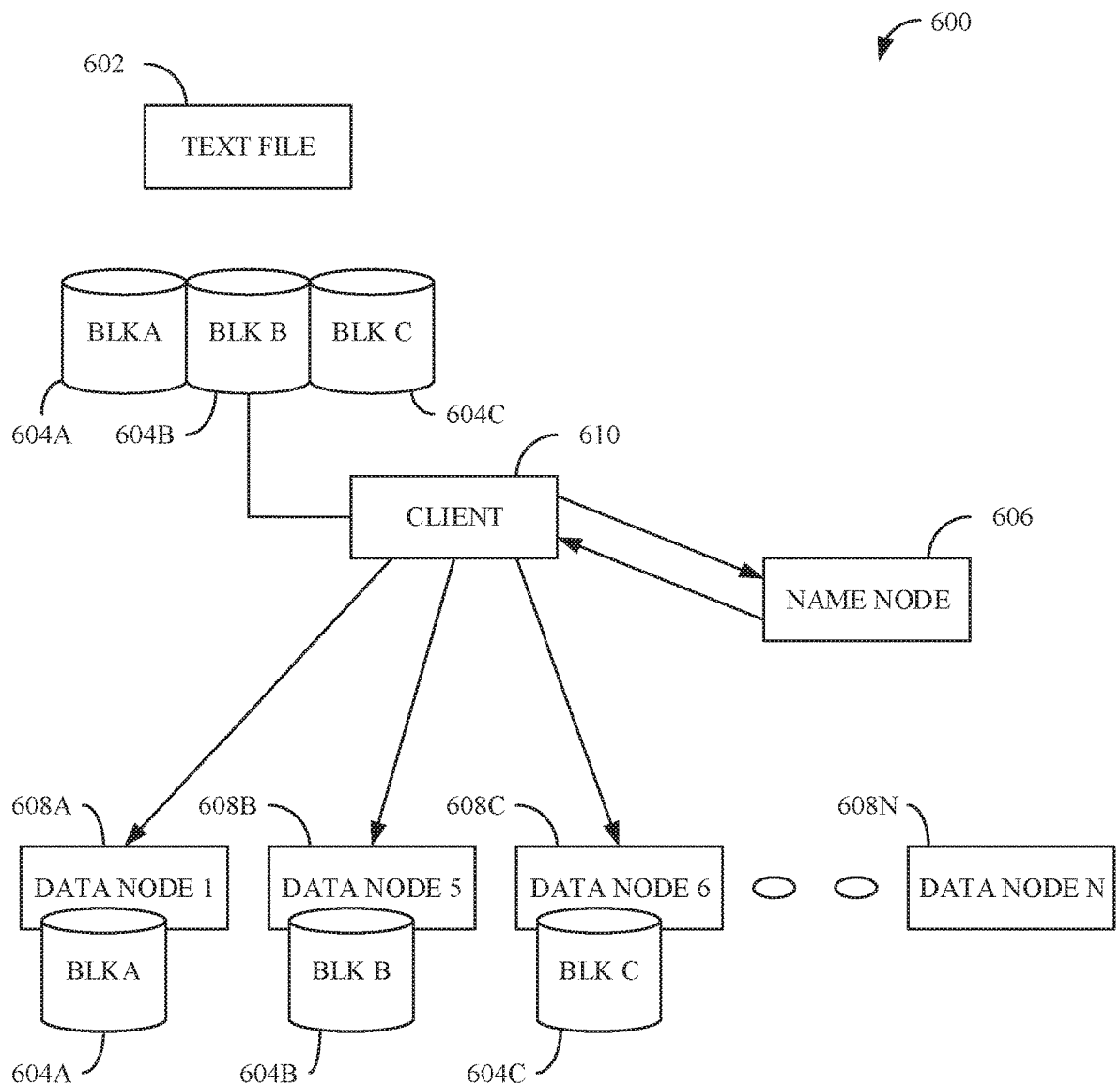
FIGS. 6 and 7 illustrate a Hadoop Distributed File System in accordance with some embodiments.
Figure 7:
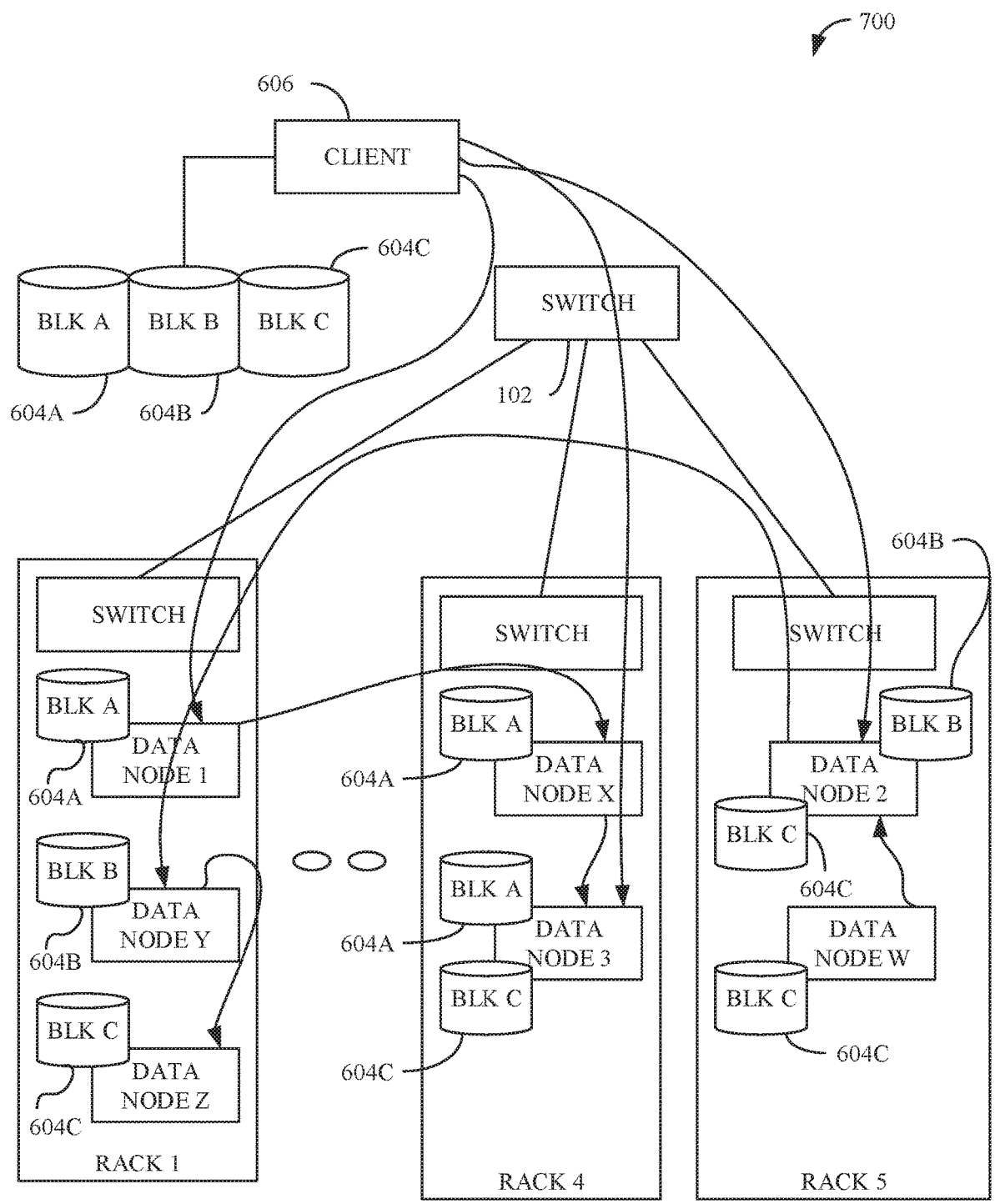

Embodiments can be implemented in any number or variety of systems in which data replication is to be performed. By way of non-limiting example, FIG. 6 and show Hadoop Distributed File Systems (HDFS) 600 and 700 in which example embodiments may be implemented. As shown in FIG. 6, a text file 602 may be comprised of the blocks, Blk 604*a*, Blk 604*b*, and Blk 604*c*. The text file 602 may be 1 TB in size, and thus, may have a 3 TB storage requirement due to replication if each block is replicated at least 3 times. In the example shown in FIG. 7, for every block of data, two copies may exist within one rack (e.g., BLK 604*b* in Rack 1, BLK 604*a* in Rack 4, and BLK 604*c* in Rack 5) and a third copy may exist in a different rack (e.g., BLK 604*a* in Rack 1, BLK 604*b* in Rack 5 and BLK 604*c* in Rack 4). A HDFS may have a central decision entity, such as name node 606, that may provide a list of data nodes to write to. In FIG. 6, for the blocks, the name node 606 may provide data nodes 608*a*, 608*b*, and 608*c* to be written to. In this configuration a bottleneck may cause performance degradations. The storage bottlenecks may be overcome with RAID configurations. Consistent with embodiments disclosed herein, the name node 606 may provide a set of data nodes without regard to network congestions (i.e., rack-level and inter-rack bottlenecks). The name node 606 and a client 610 can communicate a set of data node candidates to the fabric (such as fabric interconnect architecture 100), and the fabric can decide the targets. Information regarding the targets selected by the fiber can be passed back to the name node 606 where it can be logged.

Figure 8:
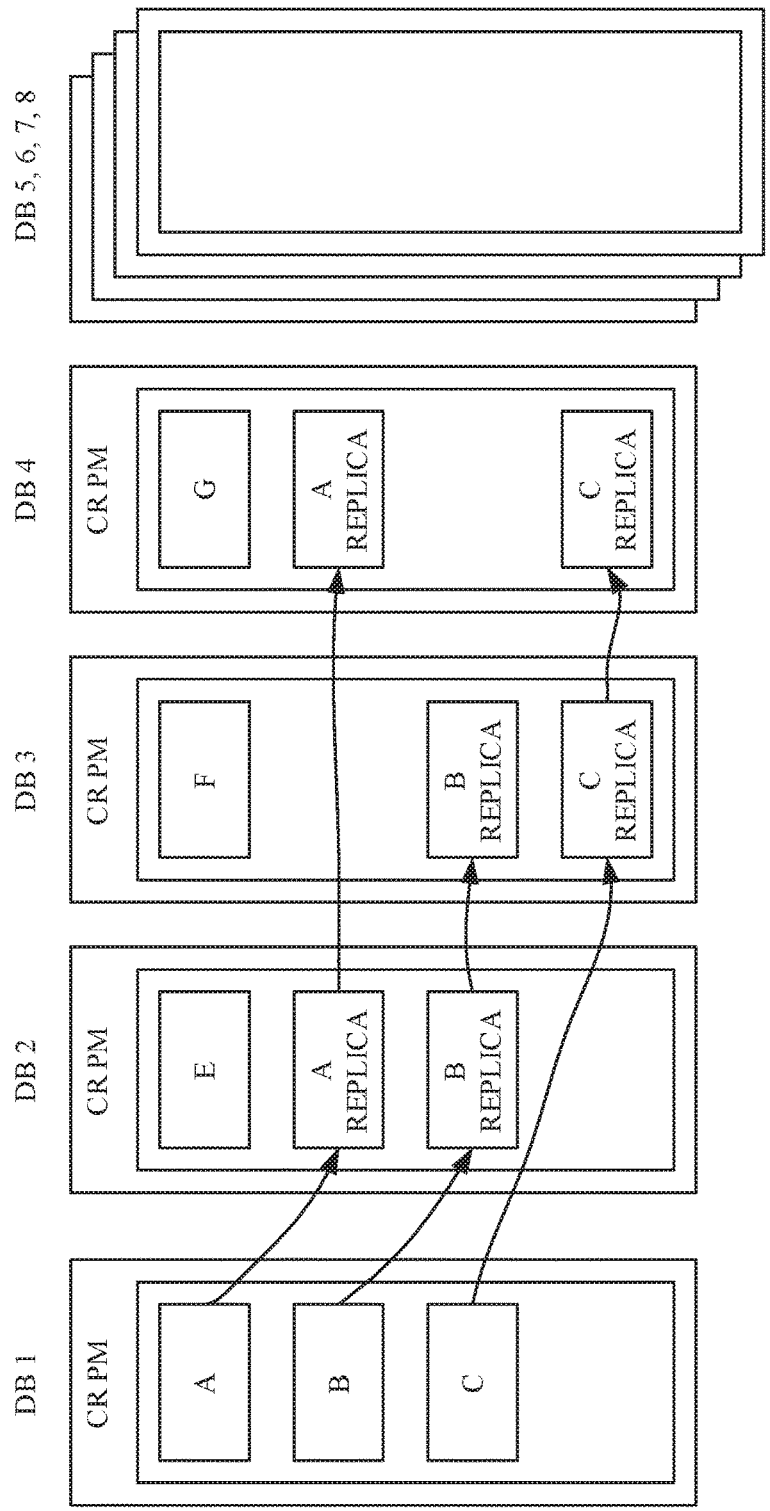
FIG. 8 illustrates a persistent memory system in accordance with some embodiments.

FIG. 8 shows a persistent memory system 800 in accordance with some embodiments. For various processing tasks, the persistent memory system 800 may have multiple replicas of data. As shown in FIG. 800, there may be eight nodes (DB1 though DB8), and a database may need to have replication such that the persistent memory system 800 can continue even if two nodes suffer a malfunction. Blocks A, B, C may be replicated in memory such that even if DB1 and DB2 fail, or even if DB1 and DB3 fail (or any such combination of two nodes), the data is recoverable. These kind of schemes have the option of selecting from different nodes (e.g., DB1's data, one can choose from DB1, DB2 ... DB8). Enabling the fabric interconnect architecture to use such information, factor-in the network, and communicate the selection made back to the application allows for improved efficiencies in a data center.

Figure 9:
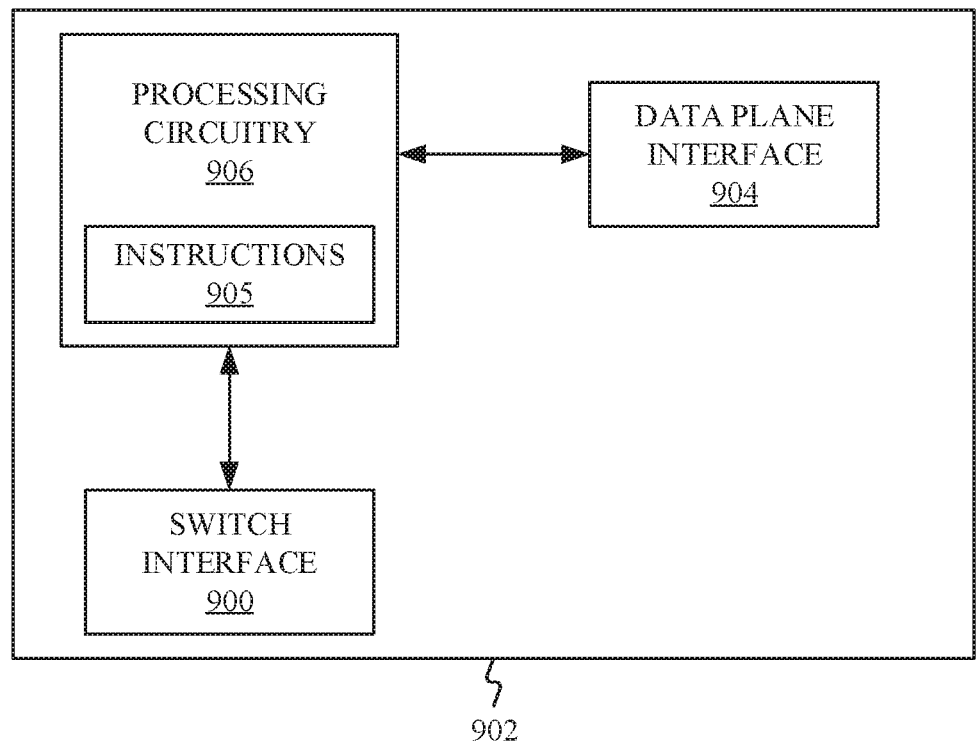
FIG. 9 illustrates a block diagram of a hardware switch in accordance with some embodiments.

FIG. 9 illustrates a control device 902 in accordance with some embodiments. The control device 902 can be a switch, such as the switch 102. The control device 902 includes a switch interface 900 to communicate with one or more hardware switches or nodes. For example, the switch interface 900 can include an egress interface to communicate with a set of nodes and an ingress interface to communicate with a software stack and the set of nodes.

The control device 902 includes processing circuitry 906 to perform functionalities and operations as described herein. It will be understood that any or all of the functions and operations performed by processing circuitry 906 can be executed with hardware, software, firmware, or any combination thereof. In some embodiments, processing circuitry 906 can comprise one or more processing cores, such as a core of the control device 902.

In various embodiments, the processing circuitry 906 can be configured to receive, from a software stack via an ingress interface, a multicast message. The processing circuitry 906 can also receive, from the software stack, the application data for distribution to a plurality of nodes. Moreover, the processing circuitry 906 can select a plurality of nodes from a set of nodes and distribute a copy of the application data to the selected nodes based on the constraint. In some embodiments, the plurality of nodes can be a subset of the set of nodes and the quantity of the plurality of nodes can equal the number of nodes the application data is distributed to.

The processing circuitry 906 can also be configured to transmit, to a software stack, a return message. The return message can include information informing the software stack of the identity of the plurality of nodes to which the copy of the application data was distributed.

The processing circuitry 906 can also be configured to distribute a copy of the application data to a second switch associated with a second set of nodes. The second switch and second set of nodes can be located in a different geographic region than a first set of nodes. For example, the second switch and second set of nodes may be located in California and the first set of nodes may be located in Virginia. The processing circuitry 906 can also be configured to receive a listing of nodes to which the copy of the application data was distributed from the second switch and transmit the listing of nodes and a switch identifier of the second switch to the software stack. By receiving the listing of nodes and transmitting the switch identifier to the software stack, the software stack, or an application executing within the software stack, can know where to find the copy of the application data should the software stack or application need to request the copy of the application data.

The processing circuitry 906 can also be configured to receive latency information from the set of nodes and utilize the latency information and a latency requirement in selecting the plurality of nodes from the set of nodes. As discussed herein, using the latency information and latency requirement can assist the processing circuitry 906 in selecting nodes that have a certain level of performance that may be needed by the software stack or application.

EXAMPLE METHODS

Figure 10:
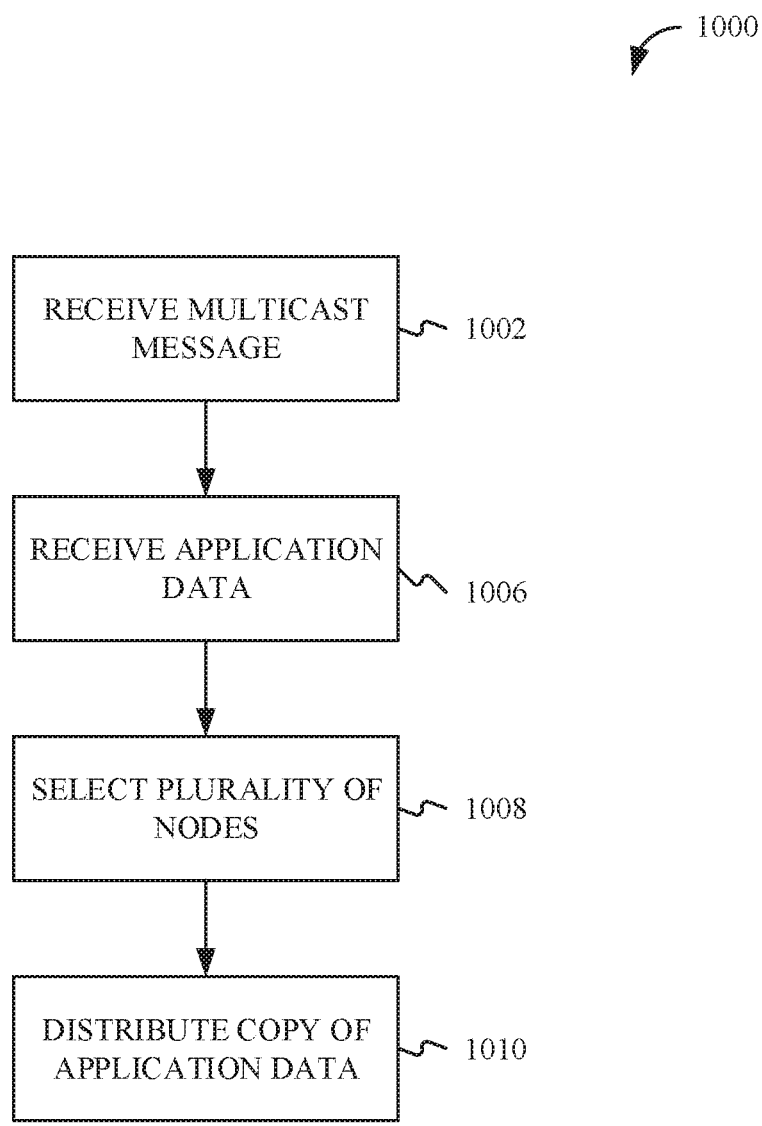
FIG. 10 illustrates an example method in accordance with some embodiments.

Various methods can be implemented in accordance with various embodiments to perform functions of usage models described above, as well as other usage models. FIG. 10 is a flow diagram of an example method 1000 in accordance with some embodiments. A control device, for example the switch 102, as described above with respect to FIGS. 1-8 or elements thereof, can perform operations of the example method 1000. Accordingly, the example method 1000 will be described with reference to components of FIGS. 1-8. For example, processing circuitry 906 can perform one or more operations of example method 1000.

The example method 1000 begins with operation 1002 with the processing circuitry 906 receiving a multicast message. As described herein the multicast message can include information, such as a constraint, that allows the fabric interconnect architecture 100 or components thereof such as switch 102 to make decisions regarding routing and spawning the multicast. For example, the multicast message may include a constraint that indicates how application data is to be distributed and the constraint can include a listing of the set of nodes and a number of nodes to which the application data is to be distributed.

The example method 1000 continues with operation 1004 with processing circuitry 906 receiving the application data for distribution to a plurality of nodes such as nodes 104*b*. The plurality of nodes can be a subset of the set of nodes equaling the number of nodes.

The example method 1000 continues with operation 1006 with processing circuitry 906 selecting the plurality of nodes from the set of nodes. The processing circuitry 906 can select the plurality of nodes based on information in the constraint. For example, the processing circuitry 906 can select nodes base on a geographic requirement in the constraint. The geographic requirement can be that the node, or a second switch associated with a second set of nodes, be a certain distance away from other nodes. Furthermore, the plurality of nodes can be selected based on a latency requirement included in the constraint. For instance, the data may been to be distributed quickly and retrieved quickly. In this instance, the plurality of nodes may be selected based on the plurality of nodes have a latency that satisfices the ability receive and distributed data at a certain latency. In order to utilize a latency requirement the processing circuitry 906 can receive, either by requesting or via push notification, latency information from the set of nodes.

The example method 1000 continues with operation 1006 with processing circuitry 906 distributing a copy of the application data to the plurality of nodes based on the constraint.

The example method 1000 can include the processing circuitry 906 receiving heartbeat information from the set of nodes. Using the heartbeat information, the processing circuitry 906 can determine if a node having the application data stored thereon becomes unavailable. For example, if heartbeat information is not received from a node that has application data stored therein, the processing circuitry 906 can distribute the application data to a second plurality of nodes and send an updated return message identifying the second plurality of nodes to the software stack.

In embodiments, the example method 1000 can include the control device 902 providing a constraint field to a respective one of the one or more hardware switches (e.g., hardware switch 102) that includes information regarding an action to be taken by the respective one of the one or more hardware switches in response to receiving the data packet. In embodiments, the example method 1000 can include detecting capability information for the one or more hardware switches and distributing the plurality of packet streams based at least in part on capability information for the one or more hardware switches.

The example method 1000 can include additional operations such as, for example, detecting traffic load characteristics corresponding to the plurality of packet streams and directing one or more packet streams to the one or more hardware switches based on traffic load characteristics.

The example method 1000 can include any other operations or functionalities of the control device 902 or usage model thereof, described above with respect to FIGS. 1-8. Operations can be performed in any order or in parallel where appropriate. The method 1000 can be performed by hardware, firmware, software, or any combination thereof.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more processors of the control device 902 may be configured by firmware or software (e.g., instructions 905 (FIG. 9), an application portion, or an application) as a module that operates to perform specified operations. In an example, the software may reside on at least one machine-readable medium. In an example, the software, when executed by the underlying hardware of the module (e.g., the control device 902), can include instructions 905 (FIG. 9) to cause the hardware to perform the specified operations.

For example, instructions 905 can cause hardware to detect characteristics of a plurality of packet streams received at a switch interface or at Ethernet ports of fixed logic hardware switches. The characteristics can include whether a respective packet stream of the plurality of packet streams is a simple packet stream, based on a number of central processing unit (CPU) machine cycles are expected to be used by the respective packet stream. The instructions 905 can cause the hardware to distribute the plurality of packet streams between a hardware switch and software data plane components based on detected characteristics of the plurality of packet streams, such that simple packet streams of the plurality of packet streams are distributed to the hardware switch.

In various embodiments, the instructions 905 can optionally cause the hardware to detect traffic load characteristics corresponding to the plurality of packet streams and to direct one or more packet streams to the one or more hardware switches based on traffic load characteristics. The instructions 905 can cause the hardware to detect that a packet processing workload has fallen below a threshold value based on the detected traffic load characteristics, and to instructing at least one processing core to enter a sleep mode responsive to the detecting.

In some embodiments, the instructions 905 can cause the hardware to distribute at least one packet stream to the at least one hardware switch (e.g., hardware switch 102) based on a rule stored in a TCAM corresponding to the at least one hardware switch. In embodiments, the hardware may store the rule in the TCAM based on an algorithm for storing rules in TCAM according to the detected traffic load characteristics.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions 905 for execution by a machine (e.g., the control device 902, switch 102 or any other module) and that cause the machine to perform any one or more of the techniques of the present disclosure, or that is capable of storing, encoding or carrying data structures used by or associated with such instructions. In other words, the processing circuitry 906 (FIG. 9) can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 905 may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Additional Notes & Examples

Example 1 may include a switch that may comprise an egress interface, an ingress interface, and processing circuitry. The egress interface may communicate with a set of nodes. The ingress interface may communicate with an application. The processing circuitry may be configured to receive, from the application, a multicast message that may include a constraint that may indicate how application data is to be distributed. The constraint may include a listing of the set of nodes and a number of nodes to which the application data may be distributed. The processing circuitry may be configured to receive, from the application, the application data for distribution to a plurality of nodes. The plurality of nodes may be a subset of the set of nodes equaling the number of nodes. The processing circuitry may select the plurality of nodes from the set of nodes. The processing circuitry may distribute a copy of the application data to the plurality of nodes based on the constraint.

In Example 2, the subject matter of Example 1 can optionally include the processing circuitry being further configured to transmit, to the application, a return message informing the application of the identity of the plurality of nodes to which the copy of the application data was distributed.

In Example 3, the subject matter of any of Examples 1 or 2 can optionally include the processing circuitry being configured to distribute the copy of the application data to the plurality of nodes including the processing circuitry being configured to distribute the copy of the application data to a second switch associated with a second set of nodes.

In Example 4, the subject matter of Example 3 can optionally include the constraint including a geographic requirement, the second switch satisfying the geographic requirement.

In Example 5, the subject matter of any one of Examples 3 or 4 can optionally include the processing circuitry being further configured to: receive a listing of nodes to which the copy of the application data was distributed from the second switch, and transmit the listing of nodes and a switch identifier of the second switch to the application.

In Example 6, the subject matter of any one of Examples 1-5 can optionally include the constraint including a group identifier including a listing of the set of nodes.

In Example 7, the subject matter of Examples 1-6 can optionally include the constraint including a group identifier including a listing of switches, each of the switches having an associated set of nodes.

In Example 8, the subject matter of Examples 1-7 can optionally include the constraint including a latency requirement. The processing circuitry can optionally be further configured to: receive latency information from the set of nodes, and utilize the latency information and the latency requirement in selecting the plurality of nodes from the set of nodes.

In Example 9, the subject matter of Examples 1-8 can optionally include the processing circuitry being further configured to: receive heartbeat information from the set of nodes; distribute the copy of the application data to a second plurality of nodes when a heartbeat information is not received from one of the plurality of nodes; and transmit an updated return message identifying the second plurality of nodes to the application.

In Example 10, a system can comprise a first control device and a second control device. The first control device may be associated with a first set of nodes. The first control device can include a first egress interface to communicate with the first set of nodes, a first ingress interface to communicate with an application, and first processing circuitry configured to: receive, from an application, a multicast message including application data to be distributed and a constraint for the application data, the constraint including a number of nodes to which the application data is to be distributed, select a first plurality of nodes from the first set of nodes based on the constraint, the first plurality of nodes being less than the number of nodes to which the application data is to be distributed, and distribute a copy of the application data to the first plurality of nodes. The second control device can be associated with a second set of nodes and in communication with the first control device. The second control device can include a second egress interface and a second ingress interface to communicate with the second set of nodes and the first control device and second processing circuitry configured to: receive the copy of the application data to be distributed and the multicast message from the first control device, select a second plurality of nodes from the second set of nodes, wherein the first plurality of nodes and the second plurality of nodes equals the number of nodes to which the application data is to be distributed, and distribute the copy of the application data to the second plurality of nodes.

In Example 11, the subject matter of Example 10 can optionally include the first processing circuitry being further configured to: receive, from the second control device, a first return message including identifiers for each of the second plurality of nodes to which the copy of the application data was distributed and a devise identifier for the second control device; and transmit, to the application, a second return message including the identifiers for each of the second plurality of nodes identifiers, the devise identifier for the second control device, and identifiers for each of the first plurality of nodes to which the copy of the application data was distributed.

In Example 12, the subject matter of Examples 10 and 11 can optionally include the first processing circuitry being configured to select the first plurality of nodes from the first set of nodes based on the constraint further includes the first processing circuitry configured to select the second control device from a plurality of control devices based on a geographic distance between the first control device and the second control device is defined by the constraint.

In Example 13, a machine-readable medium can include instructions that, when executed on a machine, cause the machine to perform operations. The operations can include: receiving, from an application, a multicast message including application data for distribution to a plurality of nodes and a constraint that indicates how application data is to be distributed, the constraint including a listing of the set of nodes and a number of nodes to which the application data is to be distributed, the plurality of nodes being a subset of the set of nodes equaling the number of nodes; select the plurality of nodes from the set of nodes; and distribute a copy of the application data to the plurality of nodes based on the constraint.

In Example 14, the subject matter of Example 13 can optionally include the operations further including transmitting, to the application, a return message informing the application of the identity of the plurality of nodes to which the copy of the application data was distributed.

In Example 15, the subject matter of Examples 13 and 14 can optionally include the operations further including: receiving a listing of nodes to which the copy of the application data was distributed from the second switch; and transmitting the listing of nodes and a switch identifier of the second switch to the application.

In Example 16, the subject matter of Examples 13-15 can optionally include the constraint including a group identifier including a listing of the set of nodes.

In Example 17, the subject matter of Examples 13-16 can optionally include the operations further including: receiving heartbeat information from the set of nodes; distributing the copy of the application data to a second plurality of nodes when a heartbeat information is not received from one of the plurality of nodes; and transmitting an updated return message identifying the second plurality of nodes to the application.

In Example 18, a method can include: receiving, at a switch, a multicast message from an application, the multicast message including a constraint that indicates how application data is to be distributed, the constraint including a listing of the set of nodes and a number of nodes to which the application data is to be distributed; receiving, at the switch, the application data for distribution to a plurality of nodes, the plurality of nodes being a subset of the set of nodes equaling the number of nodes; selecting, by the switch, the plurality of nodes from the set of nodes; and distributing, by the switch, a copy of the application data to the plurality of nodes based on the constraint.

In Example 19, the subject matter of Example 18 can optionally include transmitting, to the application, a return message informing the application of the identity of the plurality of nodes to which the copy of the application data was distributed.

In Example 20, the subject matter of Examples 18 and 19 can optionally include: receiving a listing of nodes to which the copy of the application data was distributed from the second switch; and transmitting the listing of nodes and a switch identifier of the second switch to the application.

In Example 21, the subject matter of Examples 18-20 can optionally include the constraint including a group identifier including a listing of the set of nodes.

In Example 22, the subject matter of Examples 18-21 can optionally include: receiving heartbeat information from the set of nodes; distributing the copy of the application data to a second plurality of nodes when a heartbeat information is not received from one of the plurality of nodes; and transmitting an updated return message identifying the second plurality of nodes to the application.

In example 23, a system can include means for receiving a multicast message from an application; means for receiving the application data for distribution to a plurality of nodes, the plurality of nodes being a subset of the set of nodes equaling the number of nodes; means for selecting the plurality of nodes from the set of nodes; and means distributing a copy of the application data to the plurality of nodes based on the constraint. The multicast message can include a constraint that indicates how application data is to be distributed. The constraint can include a listing of the set of nodes and a number of nodes to which the application data is to be distributed.

In Example 24, Example 23 can optionally include means for transmitting, to the application, a return message informing the application of the identity of the plurality of nodes to which the copy of the application data was distributed.

In Example 25, the subject matter of Examples 23 and 24 can option include: means for receiving a listing of nodes to which the copy of the application data was distributed from the second switch; and means for transmitting the listing of nodes and a switch identifier of the second switch to the application.

In Example 26, the subject matter of Examples 23-25 can optionally include the constraint including a group identifier that can include a listing of the set of nodes.

In Example 27, the subject matter of Examples 23-26 can optionally include: means for receiving heartbeat information from the set of nodes; means for distributing the copy of the application data to a second plurality of nodes when a heartbeat information is not received from one of the plurality of nodes; and means for transmitting an updated return message identifying the second plurality of nodes to the application.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A switch comprising:
an egress interface to communicate with a set of nodes;
an ingress interface to communicate with a software stack; and
processing circuitry configured to:
receive, from the software stack via the ingress interface, a multicast message including a constraint that indicates how application data is to be distributed pursuant to a service level agreement, the constraint including a list of candidate nodes to receive the multicast message and a number that specifies how many candidate nodes must receive the multicast message pursuant to the service level agreement,
select a plurality of nodes from the list of candidate nodes that satisfy the constraint,
distribute, via the egress interface, a copy of the application data to the plurality of nodes that satisfy the constraint, and
transmit, to the software stack, a return message informing the software stack of the identity of the plurality of nodes to which the copy of the application data was distributed.

2. The switch of claim 1, wherein the processing circuitry further includes processing circuitry configured to distribute the copy of the application data to a second switch associated with a second set of nodes.

3. The switch of claim 2, wherein the constraint provided to the second switch further includes at least one of geographic specifications and latency requirements that the second switch may use to make dynamic decisions affecting response time.

4. The switch of claim 2, wherein the processing circuitry further includes processing circuitry configured to:
receive a listing of nodes to which the copy of the application data was distributed from the second switch; and
transmit the listing of nodes and a switch identifier of the second switch to the software stack.

5. The switch of claim 1, wherein the constraint includes a group identifier including identifiers for the set of nodes.

6. The switch of claim 1, wherein the constraint includes a group identifier including a listing of switches, each of the switches of the listing of switches having an associated set of nodes.

7. The switch of claim 1, wherein the processing circuitry further includes processing circuitry configured to:
receive latency information or geographic information from the set of nodes; and utilize the latency information and the latency requirement in the constraint or the geographic information and the geographic specification in the constraint in selecting the plurality of nodes from the set of nodes.

8. The switch of claim 1, wherein the processing circuitry further includes processing circuitry configured to:
   receive heartbeat information from the set of nodes;
   distribute the copy of the application data to a second plurality of nodes when heartbeat information is not received from one of the plurality of nodes; and
   transmit an updated return message identifying the second plurality of nodes to the software stack.

9. The switch of claim 1, wherein the multicast message further includes the application data to be distributed and the constraint further includes identifiers for the set of nodes, a number of nodes to which the application data is to be distributed, and at least one of a geographic specification indicating that the data needs to be stored on nodes that are a minimum geographic distance apart from one another and a latency requirement of the nodes on which the data is to be stored.

10. A system comprising:
    a first control device associated with a first set of nodes, wherein the first control device includes a first egress interface to communicate with the first set of nodes, a first ingress interface to communicate with a software stack and first processing circuitry configured to:
    receive, from the software stack via the first ingress interface, a multicast message including a constraint that indicates how application data is to be distributed pursuant to a service level agreement, the constraint including a list of candidate nodes to receive the multicast message and a number that specifies how many candidate nodes must receive the multicast message pursuant to the service level agreement,
    select a first plurality of nodes from the list of candidate nodes of the first set of nodes that satisfy the constraint, the first plurality of nodes being less than the number of nodes to which the application data is to be distributed, and
    distribute, via the first egress interface, a copy of the application data to the first plurality of nodes that satisfy the constraint; and
    a second control device associated with a second set of nodes and in communication with the first control device, wherein the second control device includes a second egress interface and a second ingress interface to communicate with the second set of nodes and the first control device and second processing circuitry configured to:
    receive, via the second ingress interface, the copy of the application data to be distributed and the multicast message from the first control device,
    select a second plurality of nodes from the second set of nodes, wherein the first plurality of nodes and the second plurality of nodes equals the number of nodes to which the application data is to be distributed,
    distribute, via the second egress interface, the copy of the application data to the second plurality of nodes, and
    receive, from the second control device, a first return message.

11. The system of claim 10, wherein the first return message includes identifiers for each of the second plurality of nodes to which the copy of the application data was distributed and a device identifier for the second control device, and wherein the first processing circuitry is further configured to:
    transmit, to the software stack, a second return message including the identifiers for each of the second plurality of nodes, the device identifier for the second control device, and identifiers for each of the first plurality of nodes to which the copy of the application data was distributed.

12. The system of claim 10, wherein the first processing circuitry configured to select the first plurality of nodes from the first set of nodes that satisfy the constraint further includes the first processing circuitry being further configured to select the second control device from a plurality of control devices based on a geographic distance between the first control device and the second control device where the geographic distance is defined by the constraint.

13. The system of claim 10, wherein the multicast message further includes the application data to be distributed and the constraint further includes identifiers for the set of nodes, a number of nodes to which the application data is to be distributed, and at least one of a geographic specification indicating that the data needs to be stored on nodes that are a minimum geographic distance apart from one another and a latency requirement of the nodes on which the data is to be stored.

14. A non-transitory machine-readable medium including instructions that, when executed on a machine, cause the machine to perform operations including:
    receiving, from a software stack, a multicast message including a constraint that indicates how application data is to be distributed pursuant to a service level agreement, the constraint including a list of candidate nodes to receive the multicast message and a number that specifies how many candidate nodes must receive the multicast message pursuant to the service level agreement;
    selecting the plurality of nodes from the list of candidate nodes that satisfy the constraint;
    distributing a copy of the application data to the plurality of nodes that satisfy the constraint; and
    informing the software stack of the identity of the plurality of nodes to which the copy of the application data was distributed.

15. The non-transitory machine-readable medium of claim 14, wherein the operations further include:
    receiving a return message including a listing of nodes to which the copy of the application data was distributed; and
    transmitting the return message and a switch identifier to the software stack.

16. The non-transitory machine-readable medium of claim 14, wherein the constraint includes a group identifier including identifiers for the set of nodes.

17. The non-transitory machine-readable medium of claim 14, wherein the operations further include:
    receiving heartbeat information from the set of nodes;
    distributing the copy of the application data to a second plurality of nodes when heartbeat information is not received from one of the plurality of nodes; and
    transmitting an updated return message identifying the second plurality of nodes to the software stack.

18. The non-transitory machine-readable medium of claim 14, wherein the multicast message further includes the application data to be distributed and the constraint further includes identifiers for the set of nodes, a number of nodes to which the application data is to be distributed, and at least one of a geographic specification indicating that the data needs to be stored on nodes that are a minimum geographic distance apart from one another and a latency requirement of the nodes on which the data is to be stored.

19. A system including:
   means for receiving a multicast message from a software stack, the multicast message including a constraint that indicates how application data is to be distributed pursuant to a service level agreement, the constraint including a list of candidate nodes to receive the multicast message and a number that specifies how many candidate nodes must receive the multicast message pursuant to the service level agreement;
   means for receiving application data for distribution to a plurality of nodes, the plurality of nodes being a subset of the set of nodes equaling the number of nodes;
   means for selecting the plurality of nodes from the list of candidate nodes that satisfy the constraint;
   means for distributing a copy of the application data to the plurality of nodes that satisfy the constraint; and
   means for transmitting, to the software stack, a return message informing the software stack of the identity of the plurality of nodes to which the copy of the application data was distributed.

20. The system of claim 19, further including:
   means for receiving a listing of nodes to which the copy of the application data was distributed; and
   means for transmitting the listing of nodes and a switch identifier to the software stack.

21. The system of claim 19, wherein the constraint includes a group identifier including a listing of the set of nodes.

22. The system of claim 19, further including:
   means for receiving heartbeat information from the set of nodes;
   means for distributing the copy of the application data to a second plurality of nodes when heartbeat information is not received from one of the plurality of nodes; and
   means for transmitting an updated return message identifying the second plurality of nodes to the software stack.

23. The system of claim 19, wherein the multicast message further includes the application data to be distributed and the constraint further includes identifiers for the set of nodes, a number of nodes to which the application data is to be distributed, and at least one of a geographic specification indicating that the data needs to be stored on nodes that are a minimum geographic distance apart from one another and a latency requirement of the nodes on which the data is to be stored.

24. A processor including:
   an interface to communicate with a hardware switch; and
   processing circuitry configured to:
   implement a software stack;
   encode for transmission over the interface a multicast message including a constraint that indicates how application data is to be distributed pursuant to a service level agreement, the constraint including a list of candidate nodes to receive the multicast message and a number that specifies how many candidate nodes must receive the multicast message pursuant to the service level agreement; and
   receive a return message at the software stack subsequent to the transmission informing the software stack of the identity of the plurality of nodes to which the copy of the application data was distributed.

25. The processor of claim 24, wherein the multicast message further includes the application data to be distributed and the constraint further includes identifiers for the set of nodes, a number of nodes to which the application data is to be distributed, and at least one of a geographic specification indicating that the data needs to be stored on nodes that are a minimum geographic distance apart from one another and a latency requirement of the nodes on which the data is to be stored.

* * * * *